Figures 1, 2:
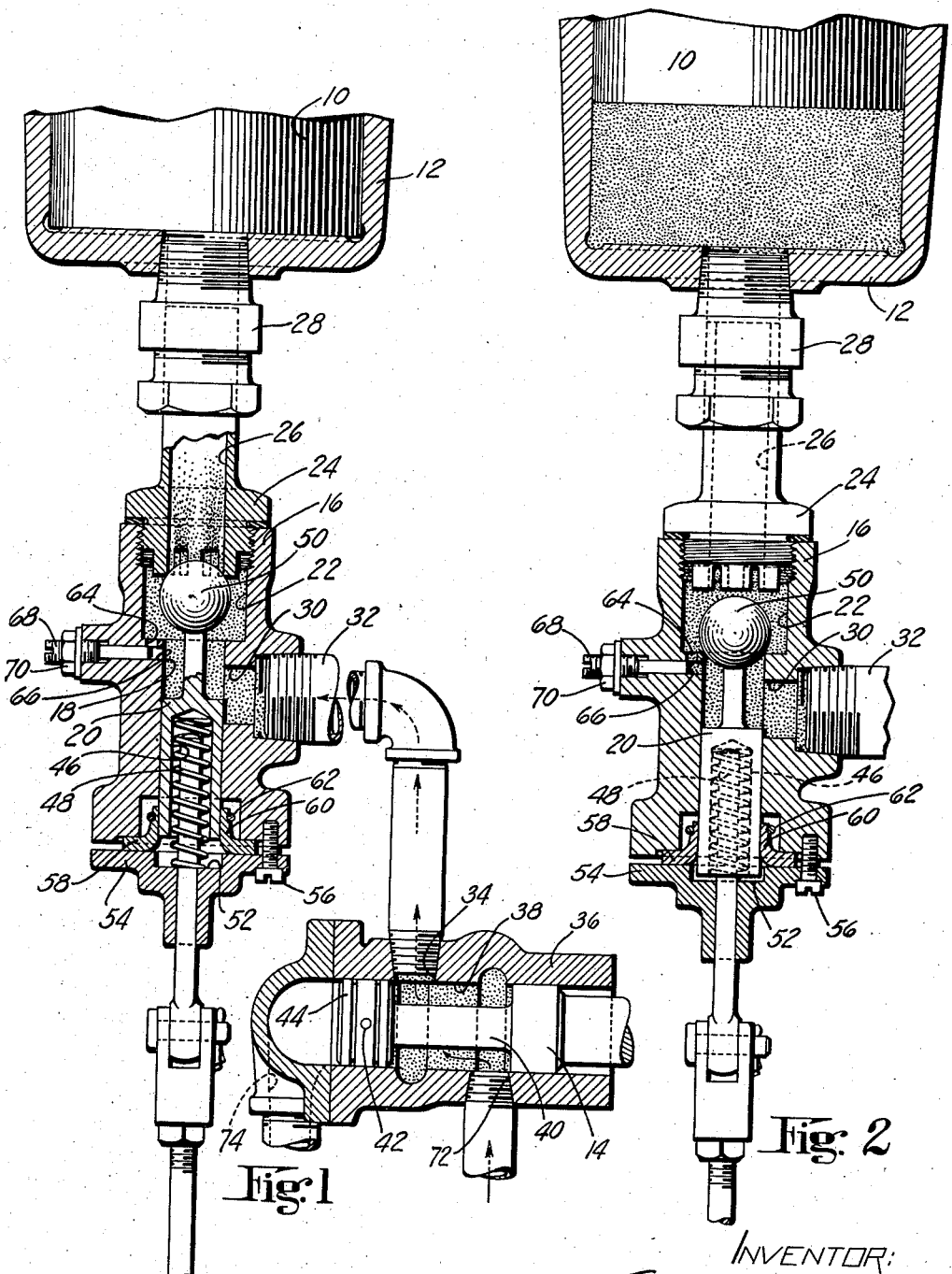

Nov. 12, 1940.　　　F. E. STRATTON　　　2,220,920
VALVE DEVICE FOR A FLUID POWER TRANSMISSION MECHANISM
Filed May 19, 1938

INVENTOR:
Frank E. Stratton
By his Attorney
Victor Cobb

Patented Nov. 12, 1940

2,220,920

UNITED STATES PATENT OFFICE 2,220,920

VALVE DEVICE FOR A FLUID POWER TRANSMISSION MECHANISM

Frank E. Stratton, Beverly, Mass., assignor to United Shoe Machinery Corporation, Borough of Flemington, N. J., a corporation of New Jersey Application May 19, 1938, Serial No. 208,870

9 Claims. (Cl. 121—38)

This invention relates to fluid power transmission mechanisms and more particularly to valve means for controlling the exhaust of the pressure fluid from the power-applying means of such mechanisms. The invention is illustrated herein as embodied in structure which is part of a machine for applying pressure to shoes disclosed in an application for Letters Patent of the United States Serial No. 201,790, filed on April 13, 1938, in the name of A. A. Lawson, although it will be understood that the invention in various novel and useful aspects is not limited to machines of that particular kind.

Machines such as illustrated in the above-mentioned application are provided with power-applying means operative by the pressure of fluid admitted thereto to effect relative movement of pressure-applying means and a shoe to press the shoe, valve mechanism for controlling the flow of the operating fluid to and from the power-applying means comprising a three-position valve having an inlet, an exhaust, and a neutral or pressure-retaining position, and automatic means for moving the three-position valve from inlet to neutral position when a predetermined pressure of the fluid is attained, and for thereafter moving the three-position valve from neutral to exhaust position after the shoe has been maintained under pressure for a definite length of time. Since such machines are constructed to apply relatively heavy pressure, it is desirable that the rate of flow of the operating fluid as it is exhausted from the power-applying means be controlled in such manner as to prevent a sudden initial release of the fluid such as might tend to cause damage to the operating parts. It is an object of the present invention to provide improved means for accomplishing that result. For the purpose in view there is provided novel valve means for controlling the exhaust of fluid from the power-applying means, this valve means comprising, as herein illustrated, a valve which is arranged to be held closed by the fluid against the resistance of a spring which tends to open the valve, and a by-pass arranged to permit initially a comparatively slow exhaust of the fluid while the valve is closed until the pressure is reduced sufficiently to permit the valve to be opened by the spring. In the illustrated construction, there is located between the three-position valve and the power-applying means a valve unit comprising a casing provided with a chamber communicating with the power-applying means, and a comparatively large passage opening into the chamber through which the fluid is admitted to and exhausted from the chamber and the power-applying means. Located in the chamber is a ball valve which is arranged to close this passage but which is normally held in open position by a spring-operated plunger mounted in the passage. When the pressure of the fluid admitted to the chamber and the power-applying means is sufficient to overcome the resistance of the spring that operates the plunger, the plunger is depressed, thus permitting the ball valve to be moved by gravity into closed position when the admission of the fluid ceases. Formed in the valve unit is a small opening or by-pass through which the fluid is permitted to exhaust from the power-applying means initially at a comparatively slow rate while the ball valve is in closed position until the pressure is reduced sufficiently to permit the ball valve to be moved to open position by the spring-operated plunger.

The above and other features of the invention, including various novel details of construction and combinations of parts, will now be more particularly described by reference to the accompanying drawing and thereafter pointed out in the claims.

In the drawing,

Fig. 1 is a view partly in front elevation and partly in section of the novel valve unit of the present invention and of other parts associated therewith, the parts being shown in the positions which they assume substantially at the beginning of the power-applying operation; and Fig. 2 is a view partly in front elevation and partly in section of the novel valve unit shown in Fig. 1, but showing the parts in the positions which they assume after the power-applying operation has been completed and during the slow exhaust of the pressure fluid from the power-applying means.

As more fully disclosed in the previously mentioned application, the machine includes in its organization power-applying means comprising a fluid operated piston 10 slidably mounted in a cylinder 12 to which fluid under pressure is supplied by a continuously operating pump (not herein shown), the flow of the fluid to and from the cylinder being controlled by a three-position valve 14 having an inlet, an exhaust, and a neutral or pressure-retaining position. The machine is also provided with automatic means, not herein shown but fully disclosed in the above-mentioned application, for moving the three-position valve from inlet to neutral position when a predetermined pressure of the fluid is attained in the cylinder and for thereafter moving the three-position valve from neutral to exhaust position at the end of a predetermined length of time.

For purposes of the present invention there is located between the three-position valve 14 and the cylinder 12 a novel valve unit comprising a casing 16 provided with a vertical central bore or passage 18 in which there is slidably mounted a plunger 20. Above the bore 18 the casing is counterbored to provide a chamber 22, the upper end of the casing being threaded to receive a connection 24 which is bored to provide an opening 26 connecting the chamber 22 with a pipe 28 communicating with the cylinder 12. The opening 26 in the connection 24 is in vertical alinement with the bore 18 in the casing 16. The bore 18 communicates through an opening or port 30 with a pipe 32 leading to a port 34 in a valve casing 36 which is bored to provide a chamber 38 in which is fitted the three-position valve 14, illustrated as a small piston having a reduced shank portion 40 to which there is secured, by means of a pin 42, a head 44. Seated within a central recess 46 in the plunger 20 is a spring 48 which acts to urge the plunger upwardly and to hold a ball valve 50 seated against the bottom face of the connection 24 with the ball valve extending partially into the opening 26. The lower end portion of the connection 24 is slotted or castellated and the upper end portion of the plunger 20 is reduced in thickness to permit fluid to flow from the pipe 32 through the port 30 and the bore 18 into the chamber 22 and from the chamber 22 through the opening 26 and the pipe 28 into the cylinder 12 when the ball valve is in the position shown in Fig. 1. At its lower end, the spring 48 bears against a shoulder 52 formed within a central recess in a plate 54 secured to the casing 16 by screws 56. The bottom face of the casing 16 is recessed to receive an annular packing ring 58 which is provided with a circular flange 60 that extends upwardly and is pressed against the plunger 20 by a ring 62 surrounding the flange. A small opening or port 64 in the casing 16 leads from the chamber 22 into a small laterally extending passage 66 which communicates with the bore 18. Extending into the passage 66 is a threaded plug 68 which may be adjusted to vary the effective size of the port 64 and which is held in adjusted position by a lock nut 70.

Formed in the valve casing 36 is a port 72 communicating with the outlet side of the above-mentioned continuously operating pump, and a port 74 which communicates with a reservoir (not herein shown) from which the fluid, preferably oil, is drawn by the pump. When the three-position valve 14 is in inlet position (Fig. 1) fluid will flow through the port 34 into the pipe 32 and from the pipe 32 through the port 30, the bore 18, the chamber 22, the opening 26, and the pipe 28 into the cylinder 12 to raise the piston 10. It will be understood that the pressure of the operating fluid in the cylinder and in the above-described connections to the three-position valve will be progressively increased to force the piston upwardly to apply the power. When the pressure of the fluid is sufficient to overcome the resistance of the spring 48 the plunger 20 is moved downwardly until it engages the shoulder 52 on the plate 54, the ball valve 50, however, being held in the position shown in Fig. 1 by the pressure of the fluid against it as the fluid flows into the cylinder. When the pressure of the fluid in the cylinder 12 has reached a predetermined maximum, the three-position valve 14 is moved into position to close the port 34 to cause the admission of fluid to cease and to lock the fluid under pressure in the cylinder 12, after which the three-position valve 14 is moved into position to open the port 34 to the port 74 at the end of a predetermined length of time. With the fluid locked under pressure in the cylinder 12 the ball valve 50 is moved by gravity into position to close the bore 18 (Fig. 2), the plunger 20 being held in engagement with the shoulder 52 at this time against the resistance of its operating spring 48 by the pressure of the fluid against it. When the port 34 has been opened to the port 74 in the valve casing 36 by movement of the three-position valve 14 to exhaust position, the fluid is exhausted from the chamber 22 and the cylinder 12 first through the by-pass, formed by the port 64 and the small passage 66, into the bore 18 below the ball valve 50 and thence through the pipe 32 and the ports 34 and 74 into the reservoir, the ball valve 50 being held seated against the casing 16 at the upper end of the bore 18 by the pressure of the fluid against it until the pressure has been reduced sufficiently to permit the spring 48 acting through the plunger 20 to lift the ball valve from this seat, whereupon the fluid is exhausted directly into the bore 18 and through the above-described connections to the reservoir. It will be understood that the port 64 is considerably smaller than the bore or passage 18 so that the flow of the fluid as it is exhausted from the cylinder is first at a comparatively slow rate with a corresponding slow reduction of the pressure in the cylinder and then at a relatively greater rate after the pressure has been reduced to such an extent as to permit the relatively light spring 48 to lift the ball valve out of position to close the passage 18. Thus there is no sudden release of the piston and the parts operated thereby from the relatively heavy pressure applied, such as might tend to damage them, or any sudden discharge of the fluid from the cylinder through the connections to the valve casing 36 under such pressure as might tend to cause an undesirable knock in the machine or danger of damage to the connections.

Having described the invention, what I claim as new and desire to secure by Letters Patent of the United States is:

1. In a fluid power transmission mechanism, the combination with power-applying means operative by the pressure of fluid admitted thereto, of a valve for controlling the exhaust of fluid from said power-applying means, said valve being arranged to be held closed by the pressure of the fluid, a spring tending to open said valve and against the resistance of which it is thus held closed by the fluid when the exhaust of the fluid begins, and a by-pass leading from one side of said valve to the other side and arranged to permit initially a comparatively slow exhaust of the fluid from said power-applying means while said valve is closed until the pressure of the fluid exhausting from the power-applying means is reduced sufficiently to permit the valve to be opened by the spring.

2. In a fluid power transmission mechanism, the combination with power-applying means operative by the pressure of fluid admitted thereto, of a valve unit comprising a casing having a chamber therein communicating with said power-applying means and a passage opening into said chamber through which pressure fluid is exhausted from said chamber, a valve for closing said passage, a spring for opening said valve, said valve being arranged to be held by the pressure fluid in said chamber against the resistance of said spring in position to close said passage when the exhaust of the fluid begins, and a by-pass through which the fluid is permitted to flow from said chamber when said passage is closed to relieve the pressure in said chamber and thus to permit the opening of the valve by said spring.

3. In a fluid power transmission mechanism, the combination with power-applying means operative by the pressure of fluid admitted thereto, of a valve unit comprising a casing provided with a comparatively large passage through which pressure fluid is admitted to and exhausted from said power-applying means and a smaller passage through which the fluid is permitted to flow at a comparatively slow rate while said large passage is closed, a valve for closing said large passage when the admission of fluid ceases, said valve being movable against the pressure of said fluid to open said large passage, and a spring for thus moving the valve when the pressure has been reduced by the slow exhaust of the fluid sufficiently to permit it.

4. In a fluid power transmission mechanism, the combination with power-applying means operative by the pressure of fluid admitted thereto, of a valve casing communicating with said power-applying means, a valve in said casing for controlling the exhaust of fluid from said power-applying means, said valve being arranged to be held closed by the fluid when the exhaust of the fluid begins, a by-pass in said casing leading from one side of said valve to the other side and through which the fluid is permitted to flow at a comparatively slow rate from said power-applying means while said valve is closed, and means for opening the valve whenever the pressure of the fluid exhausting from said power-applying means falls below a predetermined amount.

5. In a fluid power transmission mechanism, the combination with power-applying means operative by the pressure of fluid admitted thereto, of a valve unit comprising a casing having a chamber therein communicating with said power-applying means and a passage opening into said chamber through which pressure fluid is admitted to and exhausted from said chamber, a valve in said chamber for closing said passage, a spring-operated plunger in said passage arranged normally to hold said valve open but movable by the pressure fluid into a position to permit said valve to close when the admission of fluid ceases, said valve being arranged to be held closed by the fluid in said chamber when the exhaust of the fluid begins, and a by-pass arranged to permit a comparatively slow exhaust of the fluid from said chamber while said valve is closed to reduce the pressure sufficiently to permit the valve to be opened by said spring-operated plunger.

6. In a fluid power transmission mechanism, the combination with power-applying means operative by the pressure of fluid admitted thereto, of a valve unit comprising a casing having a chamber therein communicating with said power-applying means and a passage opening into said chamber through which the pressure fluid is admitted to and exhausted from said chamber, a ball in said chamber movable by gravity into position to close said passage when the admission of fluid ceases, said ball being arranged to be held in said position by the fluid when the exhaust of the fluid begins, a spring tending to move said ball to open said passage, and a by-pass arranged to permit initially a comparatively slow exhaust of the fluid from said chamber while said passage is closed by the ball to reduce the pressure sufficiently to permit the ball to be moved by said spring to open the passage.

7. In a fluid power transmission mechanism, the combination with power-applying means operative by the pressure of fluid admitted thereto, of a valve unit comprising a casing having a chamber formed therein communicating with said power-applying means and a passage opening into said chamber through which the pressure fluid is admitted to and exhausted from said chamber, a valve for closing said passage when the admission of fluid ceases, a by-pass arranged to permit a comparatively slow exhaust of the fluid from said chamber while said passage is closed to reduce the pressure in said chamber, and a spring-operated plunger arranged to be held depressed against the resistance of its operating spring by the pressure of the fluid against said valve but movable to lift the valve to open said passage whenever the pressure of the fluid on said valve falls below a predetermined amount.

8. In a fluid power transmission mechanism, the combination with power-applying means operative by the pressure of fluid admitted thereto, of a passage through which the pressure fluid is admitted to and exhausted from said power-applying means, a three-position valve for controlling the direction of flow of the fluid in said passage, said three-position valve having an inlet, an exhaust, and a neutral or pressure-retaining position, a second valve located between said power-applying means and the three-position valve for closing said passage when the three-position valve is first moved to exhaust position, a spring for opening said valve and against the resistance of which it is held closed by the fluid, and a by-pass arranged to permit a comparatively slow exhaust of the fluid while said second valve is closed to reduce the pressure sufficiently to permit said second valve to be opened by said spring.

9. In a fluid power transmission mechanism, the combination with power-applying means operative by the pressure of fluid admitted thereto, and a three-position valve for controlling the flow of the pressure fluid to and from said power-applying means, said valve having an inlet, an exhaust, and a neutral or pressure-retaining position, of a valve unit located between said pressure-applying means and said three-position valve, said unit comprising a casing having a chamber therein communicating with said power-applying means and a passage opening into said chamber through which the pressure fluid is admitted to and exhausted from said chamber, a ball in said chamber for closing said passage, a spring-operated plunger arranged initially to hold said ball in open position but movable by the pressure fluid to release said ball for movement into closed position when said three-position valve is moved to neutral position, the fluid acting thereafter to hold the ball in position to close the passage against the resistance of said spring-operated plunger when said three-position valve is first moved to exhaust position, and a by-pass arranged to permit a comparatively slow exhaust of the fluid from said chamber while said passage is closed to reduce the pressure sufficiently to permit the ball to be moved by the spring-operated plunger to open the passage.

FRANK E. STRATTON.